United States Patent [19]

Adyha et al.

[11] Patent Number: 5,369,160
[45] Date of Patent: * Nov. 29, 1994

[54] THERMOPLASTIC POLYAMIDE WITH REDUCED FLAMMABILITY

[75] Inventors: Atish Adyha; Robert L. Lilly, both of Asheville, N.C.

[73] Assignee: BASF Corporation, Parsippany, N.J.

[*] Notice: The portion of the term of this patent subsequent to Aug. 24, 2010 has been disclaimed.

[21] Appl. No.: 950,843

[22] Filed: Sep. 24, 1992

[51] Int. Cl.$^5$ .................. C08K 5/521; C08G 79/04
[52] U.S. Cl. .................. 524/140; 524/145; 524/147; 528/72; 528/287; 528/337
[58] Field of Search ............. 524/140, 145, 147; 528/337, 287, 72

[56] References Cited

U.S. PATENT DOCUMENTS 5,238,982  8/1993  Adhya et al. ................. 524/145

FOREIGN PATENT DOCUMENTS 0496150  7/1992  European Pat. Off. ............. 524/145

Primary Examiner—Paul R. Michl
Assistant Examiner—Olga Asinovsky

[57] ABSTRACT

Disclosed is a thermoplastic polyamide with reduced flammability obtained by melt mixing a polyamide with a phosphate ester of the general formula:

$$[HO(CH_2-CH_2O)_n(CH_2-\overset{\overset{\displaystyle CH_3}{|}}{C}HO)_m]_x\overset{\overset{}{}}{\underset{\underset{\displaystyle (OR)_{3-x}}{|}}{P}}=O$$

wherein
n is a number of from 1 to 10;
m is a number of from 0 to 3;
x is a number of from 0 to 3;
R is linear or branched $C_1$-to $C_{18}$-alkyl radical.

11 Claims, No Drawings

THERMOPLASTIC POLYAMIDE WITH REDUCED FLAMMABILITY

FIELD OF THE INVENTION

The present invention is directed to thermoplastic polyamide with reduced flammability and a method for its manufacture, more specifically it is directed to a polyamide obtained by the addition of a phosphate ester to the polycondensation or polymerization reaction for the production of the respective polyamide.

BACKGROUND OF THE INVENTION

The main approaches to reduce the flammability of polyamides are melt additives, topical finish treatments, and copolymerization with flame resistant monomers. Melt additives generally include halogenated organic compounds with high levels of bromine or chlorine. A second component when halogenated compounds are employed is antimony trioxide ($Sb_2O_3$). Other popular elements found in melt additives are phosphorus and molybdenum.

Phosphorus compounds are widely used to reduce the flammability of thermoplastic polymers. For example U.S. Pat. Nos. 3,987,008; 4,203,888; and 4,940,772 disclose a broad variety of organic phosphor compounds in thermoplastic polyester.

U.S. Pat. No. 3,987,008 discloses a polyphosphonate with arylene and haloarylene groups. U.S. Pat. No. 4,203,888 discloses an aryl diphosphate.

One disadvantage of these phosphorus compounds is that they are inert additives which build a separate phase in the thermoplastic polyamides with negative influence of their properties and a tendency to migrate to the surface.

U.S. Pat. No. 4,940,772 describes a process for producing a flame resistant polyester by copolymerizing a polyester with an unsaturated compound and reacting this copolyester with a specific phosphorus compound.

An object of the present invention was to provide a thermoplastic polyamide with reduced flammability and simultaneous excellent physical properties. Another object was to provide a process for the manufacture of thermoplastic polyamide with reduced flammability for the manufacture of molded articles by injection molding or extrusion.

Still another object was to provide a masterbatch of a thermoplastic polyamide with reduced flammability.

SUMMARY OF THE INVENTION

The objects of the present invention could be achieved by a thermoplastic polyamide, obtained by melt mixing a polyamide with a phosphate ester of the general formula:

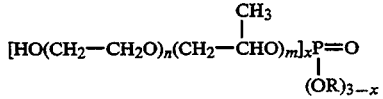

wherein
n is a number of from 1 to 10;
m is a number of from 0 to 3;
x is a number of from 0 to 3;
R is linear or branched $C_1$-to $C_{18}$-alkyl radical; at a temperature of from about 250° C. to about 300° C.

DETAILED DESCRIPTION OF THE INVENTION

Polyamides are well known by the generic term "nylon" and are long chain synthetic polymers containing amide (—CO—NH—) linkages along the main polymer chain. Suitable fiber-forming or melt spinnable polyamides of interest for this invention include those which are obtained by the polymerization of a lactam or an amino acid, or those polymers formed by the condensation of a diamine and a dicarboxylic acid. Typical polyamides include nylon 6, nylon 6/6, nylon 6/9, nylon 6/10, nylon 6/12, nylon 6 T, nylon 11, nylon 12 and copolymers thereof or mixtures thereof. Polyamides can also be copolymers of nylon 6 or nylon 6/6 and a nylon salt obtained by reacting a dicarboxylic acid component such as terephthalic, isophthalic acid, adipic acid or sebacic acid with a diamine such as hexamethylene diamine, metha-xylene diamine, or 1,4-bisaminomethyl cyclohexane. Preferred are poly-epsilon-caprolactam (nylon 6) and polyhexamethylene adipamide (nylon 6/6). Most preferred is nylon 6.

The phosphate ester of the present invention has the general formula:

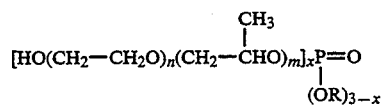

wherein
n is a number of from 1 to 10;
m is a number of from 0 to 3;
x is a number of from 0 to 3;
R is linear or branched $C_1$-to $C_{18}$-alkyl radical.

Suitable phosphate esters are for example tris (triethylene glycol) phosphate, tris (diethylene glycol) phosphate, tris (ethylene glycol) phosphate, and triethyl phosphate.

Preferred are tris (triethylene glycol) phosphate and triethyl phosphate. Most preferred is tris (triethylene glycol) phosphate.

The phosphate ester is added in an amount of from about 0.1 to about 10.0% by weight, preferably from about 0.8 to about 5.0 by weight, based on the total weight of the respective polyamide.

The phosphate ester is added in pure form or as an aqueous solution to the polyamide before processing or to the polyamide melt in an extruder at a temperature of from about 200° to about 300° C., preferably from about 250° to about 270° C.

In the case of an aqueous solution the water vapor is vented out from the twin screw extruder before the molten polyamide leaves the extruder.

An aqueous solution which has from about 8 to about 9% by weight, preferably 60 to about 90% by weight of phosphate ester may be used.

In a preferred embodiment of the invention this method is used to prepare a masterbatch of phosphate in polyamide in the form of chips, granules or pellets. In this case an aqueous phosphate ester solution of about 50 to about 60% by weight is used to form a polyamide masterbatch of a concentration of from about 1 to about 45% by weight phosphate ester, preferably 2 to 15% by weight phosphate ester in polyamide, based on the masterbatch.

The masterbatch can be deluted further or used as it is and molded into plastic materials. The polymer contains from about 100 to about 18,000 ppm, preferably from about 1000 to about 6000 ppm phosphorus, based on the polymer composition.

Besides this preferred method of incorporating the phosphate ester into the polyamide, the phosphate ester may also be added before or during the polymerization or polycondensation of the particular polyamide.

In the polymerization reaction of epsilon caprolactam for example the phosphate ester is mixed with the epsilon caprolactam and from about 0.3 to about 5% by weight of water as initiator, preferably from about 0.5 to about 3% by weight, based on caprolactam. Optionally a mono- or dicarboxylic acid like benzoic acid, terepthalic acid or isophthalic acid is added in an amount of from about 0.1 to about 0.6% by weight, preferably from about 0.2 to about 0.5% by weight, based on the caprolactam. The reaction mixture is heated at a temperature of from about 180° to about 300° C., preferably from about 240° to about 290° C. for about 10 to 25 hours until a relative viscosity (1% solution in 90% formic acid at 25° C.) of from about 1.8 to about 4.0, preferably 2.0 to 3.0 is reached. The modified nylon 6 is processed into chips by extrusion or injected into a mold by injection molding.

The amount of phosphate ester added to the polymerization reaction is from about 0.1 to about 10% by weight, based on the caprolactam and in case of the preparation of a masterbatch from about 1 to 45% by weight, preferably 2 to about 15% by weight, based on the caprolactam.

Other additives might be added to the fiber composition in effective amounts. Suitable additives are other flame retardants, fillers like talc, wollastonite, chalk, zinc sulfide, silicates, kaolin and the like, fibers like glass fibers, UV-light stabilizers, antioxidants, pigments, dyes, antistatic agents, stain resistants, antimicrobial agents, nucleating agents and the like.

The polyamide shows reduced flammability according to the LOI test described in the Examples.

EXAMPLE 1

Preparation of nylon 6. comprising tris (triethylene glycol) phosphate

Caprolactam (300 g) was mixed with tris (triethylene glycol) phosphate (TEGPa) (1.43 g) and water (9 g) in a glass vessel fitted with a stirrer. At room temperature the vessel was evacuated and filled with nitrogen three times. The mixture was heated by refluxing Dowtherm. After the caprolactam had melted the solution was stirred and refluxed for 1 H. After one hour the refluxed water was collected in another vessel and the liquid was stirred for 18 H. During this time the caprolactam had polymerized to nylon 6. The polymer was extruded and passed through cold water. The polymer properties were: $RV=2.52$, $AEG=45.9$ and $CEG=51$.

EXAMPLE 2

Preparation of nylon 6 comprising tris (triethylene glycol) phosphate in the presence of a catalyst.

All the reactants of Example 1 were added in the same proportion along with benzoic acid (0.6 g). The same procedure, as described in Example 1 was used to carry out the polymerization of caprolactam. The length of polymerization time was changed to 21 H. The polymer properties were: $RV=3.2$, $AEG=37.1$ and $CEG=51$.

EXAMPLE 3

Preparation Of a nylon 6 comprising tris (triethylene glycol) phosphate in an extruder The nylon 6 with reduced flammability was prepared in a counter rotating twin screw extruder. The temperature in the beginning of twin screw was maintained between 220° C. and 245° C. After the injection port the temperature in the extruder was maintained at 210° C. Nylon 6 (Ultramid ® from BASF AG, Ludwigshafen, Germany, $RV=2.6$) was added to the extruder through a hopper at the rate which corresponded to 93 g/min outflow of molten polymer. A solution, prepared by mixing equal weights of tris (triethylene glycol) phosphate (TEGPa) (Emery 6696-A from Quantum Chemical Corporation, Emery Div.) and water, was added through a injection port at the rate of 18 ml/min. Steam, generated in the extruder, was removed by an aspirator vacuum through a vent situated just before the diehead. The hot, compounded polymer was cooled in water and chipped. The RV of the polymer was 1.87 and the phosporus concentration was 5500 ppm.

EXAMPLE 4 (CONTROL)

In this example nylon 6 (Ultramid ® from BASF AG Ludwigshafen, Germany, $RV=2.6$) is used.

LOI - Test

The Oxygen Index of nylon 6 (Example 4) and nylon 6 comprising tris (triethylene glycol) phosphate (Example 3) were measured the ASTM method D 2863-87, the test sample was prepared by the following method:

The chips were placed in a wire mesh holder and placed in a chamber of the instrument built by U.S. Testing, Hoboken, N.J. (model #1800). The chips were lighted by a burner with flame size 25 mm long. The burner was connected to any oxygen and nitrogen source. The phosphorus concentration and the LOI for the polymers are listed in the table.

TABLE

| | LOI - TEST: | |
|---|---|---|
| | Phosphorus (ppm) | LOI |
| Example 4 (Control) | 0 | 24.3 |
| Example 3 | 5500 | 26.72 |

RV = Relative viscosity (1% solution in 90% formic acid at 25° C.)
AEG = Amino end groups
CEG = Carboxylic end groups

We claim:

1. A thermoplastic polyamide obtained by melt mixing a polyamide with a phosphate ester of the general formula:

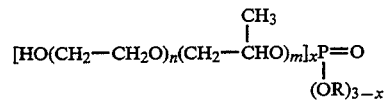

wherein
n is a number of from 1 to 10;
m is a number of from 0 to 3;
x is a number of from 1 to 3;
R is linear or branched $C_1$-to $C_{18}$-alkyl radical; at a temperature of from about 250° C. to about 300° C.

2. The polyamide according to claim 1, wherein said phosphate ester is selected from the group consisting of tris (triethylene glycol) phosphate, tris (diethylene glycol) phosphate, and triethyl phosphate.

3. The polyamide according to claim 1, wherein from about 0.1 to about 10% by weight, based on the polyamide of said phosphate ester is added.

4. The method according to claim 1, wherein said polyamide is selected from the group consisting of nylon 6, nylon 6/6, nylon 6/9, nylon 6/10, nylon 6/12, nylon 11, nylon 12, copolymers thereof and mixtures thereof.

5. The polyamide according to claim 3, wherein said polyamide is nylon 6 or nylon 6/6.

6. The polyamide according to claim 1, wherein said phosphate ester is tris (triethylene glycol) phosphate.

7. The polyamide according to claim 6, wherein said tris (triethylene glycol) phosphate is added to the polyamide in form of an aqueous solution.

8. The polyamide according to claim 1, wherein said melt mixing is performed in a twin screw extruder.

9. The polyamide according to claim 7, wherein an aqueous solution of tris (triethylene glycol) phosphate is added to the melt of the polyamide in said extruder and the water is vented out before extruding the polyamide.

10. The polyamide according to claim 8, wherein said aqueous solution has a concentration of tris (triethylene glycol) phosphate of from about 8 to about 99% by weight.

11. The polyamide according to claim 1, wherein the temperature is from about 255° to about 285° C.

* * * * *